(12) United States Patent
Liu et al.

(10) Patent No.: US 10,537,010 B2
(45) Date of Patent: Jan. 14, 2020

(54) CODED LIGHT MODULATION ARANGEMENT

(71) Applicant: SIGNIFY HOLDING B.V., Eindhoven (NL)

(72) Inventors: Junhu Liu, Shanghai (CN); Zhi Quan Chen, Shanghai (CN); Biwen Xu, Shanghai (CN); Gang G. Wang, Shanghai (CN); Gang K. Wang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/780,778

(22) PCT Filed: Nov. 28, 2016

(86) PCT No.: PCT/EP2016/078966
§ 371 (c)(1),
(2) Date: Jun. 1, 2018

(87) PCT Pub. No.: WO2017/093170
PCT Pub. Date: Jun. 8, 2017

(65) Prior Publication Data
US 2019/0342979 A1 Nov. 7, 2019

(30) Foreign Application Priority Data

Dec. 1, 2015 (WO) ................ PCT/CN2015/096137
Apr. 12, 2016 (EP) ..................................... 16164785

(51) Int. Cl.
*H05B 37/02* (2006.01)
*H05B 33/08* (2006.01)
(Continued)

(52) U.S. Cl.
CPC ......... *H05B 37/0272* (2013.01); *G08C 23/04* (2013.01); *H02J 7/0013* (2013.01);
(Continued)

(58) Field of Classification Search
CPC .......................... H05B 37/02; H05B 37/0227; H05B 37/0272; H05B 37/03; H05B 37/038;
(Continued)

(56) References Cited

U.S. PATENT DOCUMENTS 5,793,163 A    8/1998 Okuda
2007/0171180 A1*    7/2007 Akiyama ............. G09G 3/3413
                                                              345/102
(Continued)

FOREIGN PATENT DOCUMENTS

JP    2010205733 A    9/2010
JP    2011164258 A    8/2011
(Continued)

*Primary Examiner* — Jason Crawford

(57) ABSTRACT

The invention describes a coded light modulation arrangement (1), adapted to be connected between a driver (31) and a LED (3), which coded light modulation arrangement (1) comprises input terminals (10) adapted to connect to the driver (31) and to receive a drive current ($I_{DRIVE}$), an energy storage arrangement comprising a number of energy storage devices (E1, E2); a data input interface (12) realized to receive a data stream (D), said data stream (D) comprises a sequence of binary symbols comprising a logic high and a logic low; a switch arrangement comprising a number of switches (S1, S2) arranged to connect the energy storage devices (E1, E2) of the energy storage arrangement and to modulate the drive current such that, in a charging switch configuration corresponding to the logic low, a negative modulation current ($I_{NEG}$) is diverted from a drive current ($I_{DRIVE}$) of the LED (3) to the energy storage arrangement; and, in a discharging switch configuration corresponding to the logic high, a positive modulation current ($I_{POS}$) is drawn (Continued)

from the energy storage arrangement and added to the drive current ($I_{DRIVE}$) of the LED (3); and output terminals (11) adapted to connect to the LED (3) and to provide the modulated drive current directly to the LED (3) to emit the low and high radiant flux level as coded light ($L_{coded}$) to be received by a photosensor of a coded light receiver device. The invention further describes a method of performing coded light modulation for light emitted by a LED (3); a luminaire; and a coded light communication arrangement (5).

14 Claims, 6 Drawing Sheets

(51) Int. Cl.
    *H02J 7/00*     (2006.01)
    *H04B 10/524*     (2013.01)
    *H04B 10/40*     (2013.01)
    *G08C 23/04*     (2006.01)
    *H04B 10/116*     (2013.01)
    *H02J 7/34*     (2006.01)

(52) U.S. Cl.
    CPC ........... *H04B 10/116* (2013.01); *H04B 10/40* (2013.01); *H04B 10/524* (2013.01); *H05B 33/0821* (2013.01); *H02J 7/345* (2013.01)

(58) Field of Classification Search
    CPC ...... G08C 23/04; H04B 10/11; H04B 10/114; H04B 10/116
    See application file for complete search history.

(56) References Cited

U.S. PATENT DOCUMENTS

| | | | |
|---|---|---|---|
| 2011/0193495 A1* | 8/2011 | Mishima | H02M 3/1588 315/307 |
| 2013/0272716 A1* | 10/2013 | Lopez | H04B 10/1141 398/127 |
| 2014/0368128 A1* | 12/2014 | Elferich | H02M 1/15 315/297 |
| 2017/0332450 A1 | 11/2017 | Blum et al. | |

FOREIGN PATENT DOCUMENTS

| | | |
|---|---|---|
| WO | 2012035469 A1 | 3/2012 |
| WO | 2012098486 A1 | 7/2012 |
| WO | 2013061206 A2 | 5/2013 |
| WO | 2015070990 A2 | 5/2015 |

\* cited by examiner

CODED LIGHT MODULATION ARANGEMENT

CROSS-REFERENCE TO PRIOR APPLICATIONS

This application is the U.S. National Phase application under 35 U.S.C. § 371 of International Application No. PCT/EP2016/078966, filed on Nov. 28, 2016, which claims the benefit of International Patent Application No. PCT/CN2015/096137, filed on Dec. 1, 2015 and European Patent Application No. 16164785.4, filed on Apr. 12, 2016. These applications are hereby incorporated by reference herein.

FIELD OF THE INVENTION

The invention describes a coded light modulation arrangement. The invention further describes a method of performing coded light modulation, a luminaire, and a coded light communication arrangement.

BACKGROUND OF THE INVENTION

WO2013061206A2 and JP2010205733A both discloses power line communication in lighting field. Their generally structures are having a modulator at the input AC mains side to modulate data onto the AC mains wave, and having a detector in the lighting fixture to extract the data from the AC mains wave and to using the data to control a power supply of the light source to deliver a power corresponding to the data.

WO2015070990A2 discloses a LED driving circuit with a current source to provide a constant current and a capacitor arrangement to be charged and discharge according to the instant amplitude of the input voltage. JP2011164258A discloses a LED flash device with a capacitor arrangement to be switched in parallel and charged by the battery, and to be switched in series and discharge the LED at a light emission timing.

A luminaire with a light source primarily serves to provide illumination. However, it may be possible for a light source to also fulfil a secondary function. An example of such a secondary function is visible light communication or coded light (CL), in which the radiant flux of the light source is modulated between a high radiant flux level (corresponding to "logic high") and a low radiant flux level (corresponding to "logic low"). Data to be transmitted is provided as a bitstream of ones and zeros, and the lamp is driven to modulate its radiant flux accordingly. A CL receiver device with a suitable sensor (such as a photosensor) detects the different levels of radiant flux in the incident light, and converts the coded light information into a digital bitstream for further processing.

In principle, coded light is used to transfer a message from a conformant lamp to a receiver using visible light as the message carrier. The transferred message can indicate the lamp's location, and the lamp location information is further linked to location-related information such as positioning, navigation, advertisement and other applications. An LED light source is particularly well-suited to such an application on account of its essentially instantaneous response characteristics.

WO2012098486A1 discloses a circuit for CL communication, and discloses a Manchester code to encode data such that the logic high and logic low in the communication are balanced.

Changing the light intensity or radiant flux between high and low levels for signal transmission is a type of modulation. CL can be performed using amplitude modulation or pulse-width modulation (PWM). In amplitude modulation with an LED light source, the current amplitude flowing through the LED string is modulated, i.e. increased or decreased as appropriate, to achieve a corresponding increase or decrease in light intensity. A known CL modulator for an LED light source uses a post-regulator to increase or decrease the LED current as required, with a resistor to absorb or dissipate excess energy, so that this approach is associated with unfavourably high power consumption.

Therefore, it is an object of the invention to provide an improved coded light modulator.

SUMMARY OF THE INVENTION

It is advantageous to have a low power loss solution for coded light.

To address this need, a basic idea of the embodiments of the invention is using an extra energy storage to draw some current away from the light emitting element and store the energy when the logic low of coded light communication is to be emitted and to release the stored energy to the light emitting element when the logic high of coded light communication is to be emitted.

The object of the invention is achieved by the coded light modulation arrangement of claim 1; by the luminaire of claim 12; and by the coded light communication arrangement of claim 13.

According to the invention, a coded light modulation arrangement is adapted to be connected between an LED and its driver. The inventive coded light modulation arrangement comprises input terminals adapted to connect to the driver and to receive a drive current, an energy storage arrangement comprising a number of energy storage devices; a data input interface realized to receive a data stream, said data stream comprises a sequence of binary symbols comprising a logic high and a logic low; and a switch arrangement comprising a number of switches. The switches are arranged to connect the energy storage devices of the energy storage arrangement and to modulate the drive current such that, in a charging switch configuration corresponding to the logic low, a negative modulation current is diverted from a drive current of the light-emitting load to the energy storage arrangement such that the LED is adapted to emit a low radiant flux level and an energy of the diverted current is adapted to be stored at the energy storage arrangement; and, in a discharging switch configuration corresponding to the logic high, the energy stored at the energy storage arrangement is adapted to be released as a positive modulation current is drawn from the energy storage arrangement and added to the drive current of the light-emitting load such that the LED is adapted to emit a high radiant flux level. The arrangement further comprises output terminals adapted to connect to the LED and to provide the modulated drive current directly to the LED to emit the low and high radiant flux level as coded light to be received by a photosensor of a coded light receiver device.

In the context of the invention, the "drive current" of the light-emitting load is to be understood as the current supplied by the driver or the power supply. During normal operation of the lamp, i.e. when the lamp is only being operated for the purposes of illumination, the light source(s) effectively receive the unaltered drive current and will emit light at the "normal" level of radiant flux. This "normal"

level remains essentially constant despite the possible ripple caused by the periodicity of the input AC mains, when the lamp fulfils only its primary function of providing illumination, since the drive current remains essentially constant despite the above possible ripple. When the lamp is also operated to fulfil its secondary function, i.e. to operate as a coded-light modulator, the current arriving at the lamp is no longer constant. Instead, the lamp current will be less than the "normal" drive current in order to decrease the radiant flux to produce a logic low/zero, or greater than the "normal" drive current in order to increase the radiant flux to produce a logic high/one.

In the context of the invention, the expression "negative modulation current" is to be understood as a quantity of current that is diverted (i.e. subtracted) from the drive current supplied by the driver, resulting in a decrease in the current that finally flows through the light emitting element and the radiant flux thereof. The lower radiant flux level corresponds to logic low, or "0", in the coded light. Similarly, the expression "positive modulation current" is to be understood as a quantity of current that is added to the drive current, resulting in an increase in the current that finally flows through the light emitting element and the radiant flux. The higher radiant flux level corresponds to logic high, or "1", in the coded light. At any one time, the coded light modulation arrangement can be configured to increase the drive current, to decrease the drive current, or to leave the drive current unchanged. In other words, a step of subtracting from the drive current is temporally independent and separate from a step of adding to the drive current.

An advantage of the inventive coded light modulation arrangement is that it does not require any modification of an existing driver, so that an existing luminaire can easily be upgraded by inserting a coded light modulation arrangement according to the invention between the driver and the lighting load. Further, the power is commuted by the energy storage arrangement without consumed. The transmitter of a coded light communication arrangement can therefore be obtained in a very straightforward and cost-effective manner.

According to the invention, the method of performing coded light modulation on light emitted by a light-emitting load comprises a step of reducing the radiant flux of the emitted light by diverting a negative modulation current from a drive current of the light-emitting load and storing the diverted current in an energy storage arrangement; and a step of increasing the radiant flux of the emitted light by adding a positive modulation current, drawn from the energy storage arrangement, to the drive current of the light-emitting load.

An advantage of the inventive method is that the light can be modulated in a CL procedure without any significant increase in power consumption. Therefore, an illumination system that uses the inventive method can provide added functionality with little or no additional energy costs.

According to the invention, the luminaire comprises a lighting load comprising a number of light sources; a driver for providing a drive current to the lighting load; and the inventive coded light modulation arrangement arranged between the driver and the lighting load.

An advantage of the inventive luminaire is that it not only fulfils a lighting function, but can also fulfil a further communications function by allowing its emitted light to carry encoded information or data when the light source is on.

According to the invention, the coded light communication arrangement comprises at least one such luminaire, a transmitter module realized to transmit a data packet to a luminaire for transmission as coded light; and a receiver module realized to detect coded light in the light emitted by a luminaire of the communication arrangement, and to extract a data packet from the detected coded light.

The inventive coded light communication arrangement can be used in any environment that utilizes a luminaire (or several) that can be controlled to increase or decrease its radiant flux such that the different levels of radiant flux can be detected and decoded to extract the data transmitted as coded light.

The dependent claims and the following description disclose particularly advantageous embodiments and features of the invention. Features of the embodiments may be combined as appropriate. Features described in the context of one claim category can apply equally to another claim category.

A luminaire for performing CL modulation can incorporate any suitable light source, i.e. any light source that can be controlled sufficiently precisely to increase and decrease its radiant flux to transmit a bitstream of information. An LED is an example of such a light source, since the radiant flux emitted by an LED responds essentially immediately to any change in current through the LED. Therefore, without restricting the invention in any way, it may be assumed in the following that the lighting-emitting load of a luminaire comprises one or more LEDs, and that the luminaire includes an LED driver to supply a drive current (also referred to as "load current" or "LED current") to the LEDs.

In a coded light system, a data stream is encoded in the light emitted by the light source as described above, by decreasing the radiant flux to represent logic low or "zero", and increasing the radiant flux to represent logic high or "one". In the following, the terms "logic zero", "logic low", "logic 0" and "negative modulation interval" are synonymous and may be used interchangeably. Similarly, the terms "logic one", "logic high", "logic 1" and "positive modulation interval" are synonymous and may be used interchangeably. The principle of the invention lies in diverting some of the drive current whenever a logic zero is required, and storing the associated energy for later use during a modulation task. In this way, energy consumption of the coded light modulation arrangement can be kept favourably low. The drive current that is "superfluous" during logic zero intervals is not dissipated as excess energy, but instead is stored and later retrieved to augment the drive current to a level corresponding to logic one.

The diverted current can be stored in any suitable energy-storage device until required. For example, an arrangement comprising capacitors and/or inductors might be used to store the "superfluous" current energy during a negative modulation interval. In one preferred embodiment of the invention, an energy storage device is a capacitor, and the energy storage arrangement comprises a plurality of capacitors. In such a realization, the diverted current is used to charge one or more of the capacitors during a logic zero interval in which the lamp's radiant flux is correspondingly decreased. During a logic one interval, the energy stored in the capacitors is retrieved by allowing one or more of the capacitors to at least partially discharge, and the resulting current is added to the drive current to obtain a current level that will increase the radiant flux of the lamp to a logic high level.

The energy storage devices of the energy storage arrangement and the switches of the switch arrangement can be connected in any suitable manner. In a preferred embodiment of the invention, a switch of the switch arrangement is connected in series with the energy storage device. In this way, when the switch is in a first position, the negative modulation current can be diverted into the energy storage device, and when the switch is in a second position, the energy storage device can discharge the stored energy as positive modulation current for adding to the drive current.

The amplitude and duration of a modulated bit in the coded light stream can be governed by various factors. Primarily, a burst of coded light should not be perceptible to anyone in the vicinity of the lamp. This requirement essentially places restrictions on the peak-to-peak difference between high and low levels of radiant flux, and also on the maximum duration of a logic level, e.g. the maximum duration of "1" level or a "0" level (a single bit or a series of bits). Also, transition times between logic levels (1 to 0; 0 to 1) may by subject to certain maximum durations. Furthermore, the sensitivity of a receiver arrangement may require a minimum peak-to-peak difference and/or a minimum logic level duration in order to be able to correctly detect and decode the bitstream. Preferably, the choice of energy storage devices is based on these requirements. For example, in a preferred embodiment of the invention, the energy storage arrangement comprises a plurality of capacitors arranged such that a first switch configuration connects the energy storage devices in a parallel arrangement. Such a configuration allows the energy of the negative modulation current to be quickly stored by essentially distributing it among the capacitors. The first switch configuration may therefore be referred to as a "charging switch configuration", a "negative modulation switch configuration", etc. In a further preferred embodiment, the capacitors of the energy storage arrangement are arranged such that a second switch configuration connects the energy storage devices in a series arrangement. Such a configuration allows the energy stored in the capacitors to quickly discharge as positive modulation current. The second switch configuration may therefore be referred to as a "discharging switch configuration", a "positive modulation switch configuration", etc.

The switch arrangement can comprise any suitable types of switch, i.e. any switches that can be controlled to connect the energy storage devices in a desired configuration within a certain time limit. Preferably, a switch of the switch arrangement comprises a semiconductor switch, for example a bipolar junction transistor, since a semiconductor switch, if controlled appropriately, can be turned on or off very quickly. The switches of the switch arrangement are preferably controlled in a synchronous manner, e.g. any switches that are to be turned "on" or "off" are preferably all switched at essentially the same time.

The negative modulation current should be guided or controlled in such a way that this current portion only passes to the energy storage arrangement. Similarly, the positive modulation current should be guided or controlled in such a way that this current portion can only be added to the lamp drive current. To this end, in a particularly preferred embodiment of the invention, the coded light modulation arrangement comprises a first current controller realized to direct the negative modulation current to the energy storage arrangement, and a second current controller realized to direct the positive modulation current to the light-emitting load. For example, a current controller can be realized as an arrangement of semiconductor switches between two nodes of the coded light modulation arrangement, and which only passes current when the voltage difference between these two nodes exceeds a certain threshold value. When this condition is not fulfilled, the current controller will behave as an open circuit. In a relatively straightforward embodiment, a current controller is realized to pass a predefined current when the voltage difference exceeds the threshold value. In a more elaborate embodiment, a control circuit could regulate the magnitude of the current passed by the current controller.

The coded light modulation arrangement according to the invention can be realised as a stand-alone unit, which can be used to retrofit existing lamps. To this end, the coded light modulation arrangement preferably comprises input terminals for connection to a driver realized to provide a drive current to a lighting load; and output terminals for connection to the lighting load.

In a further preferred embodiment of the invention, the coded light modulation arrangement comprises a data input interface realized to receive a data stream to be transmitted as coded light by the LED lighting load, and a switch controller, for example a microcontroller, realized to derive switch configurations for the coded light modulation arrangement on the basis of the data stream. Preferably, the light emitted by a luminaire should not perceivably change in intensity during a modulation phase, i.e. the mean radiant flux of the emitted light during the transmission of coded light should by the same as the mean radiant flux during normal operation of the lamp. Furthermore, the modulated data stream should preferably be self-clocking. This can be achieved for example by encoding the data according to a version of Manchester code, or any other line code that is self-clocking and does not have a DC component so as to maintain the electricity balance on the energy storage arrangement. In a preferred embodiment of the invention, this can be achieved by ensuring that the average or mean load current (the current though the LED lighting load) during modulation is essentially the same as the drive current supplied by the driver of the lighting arrangement.

A coded light communication arrangement according to the invention is particularly suited to installation in a retail environment, since retail locations are often illuminated using energy-efficient LED luminaries. For example, a CL message sent by a luminaire can indicate the location of the luminaire in the overall system, and the location information can be linked to location-related information such as positioning, navigation, advertisement etc. A receiver may be incorporated in any suitable device, for example in a mobile consumer device such as a smartphone. In a retail environment illuminated by luminaires with CL capability, such an arrangement can allow sending of precise product information tailored to a user's preferences.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
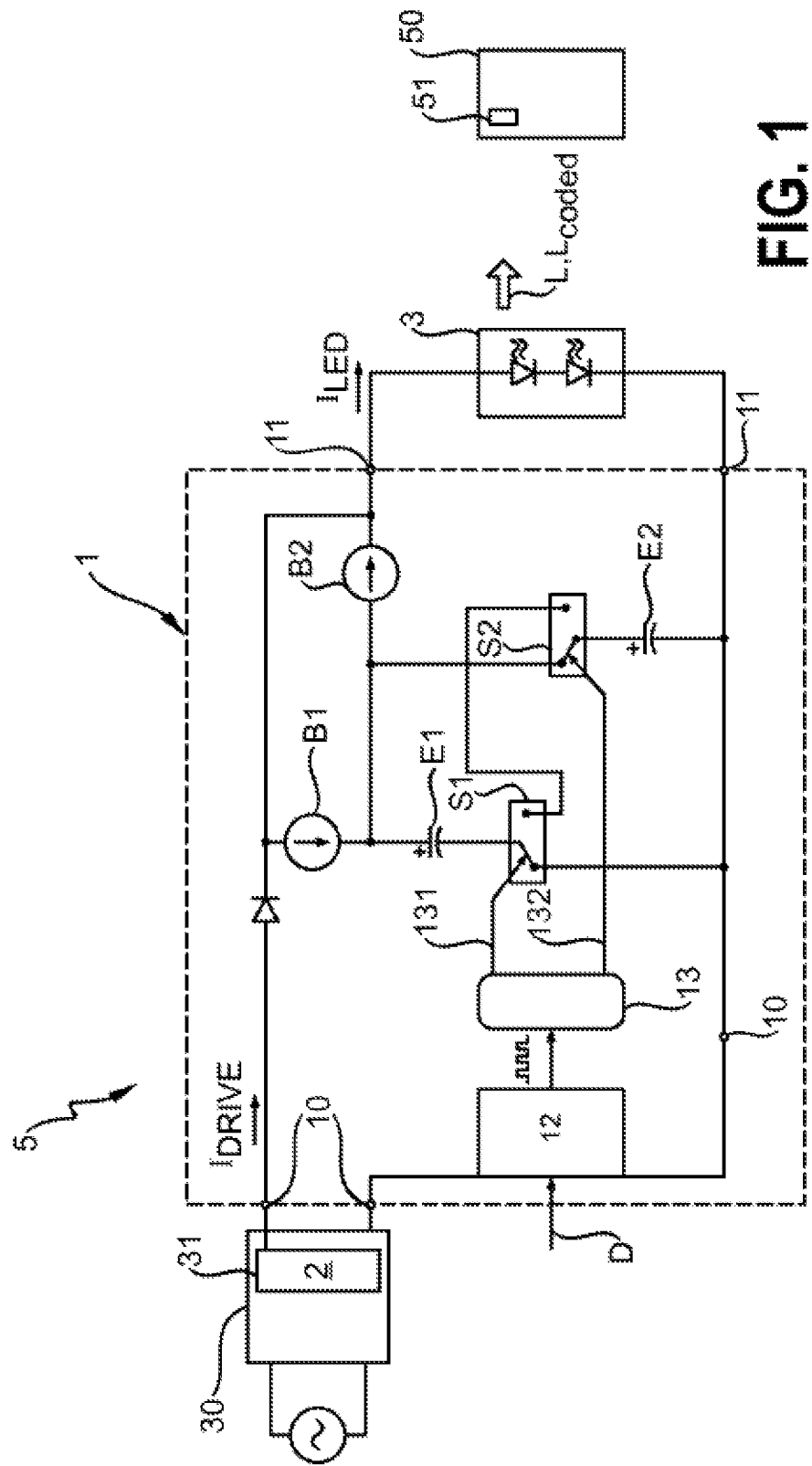
FIG. 1 shows a coded light communication arrangement with an embodiment of a coded light modulator according to the invention.

FIG. 1 shows a CL communication arrangement 5 with an embodiment of a coded light modulator 1 according to the invention. The CL communication arrangement 5 uses an LED luminaire as transmitter, and any suitable device 50 as receiver. The diagram shows the coded light modulator 1 arranged between a driver 31 and an LED light source 3, which can comprise any number of LEDs. The driver 31 can be part of a usual input stage 30 with a rectifier etc. for converting mains power into a DC voltage suitable for the LED light source 3. The coded light modulator 1 has input terminals 10 for connecting to the driver 31 and output terminals 11 for connecting to the LED light source 3. During operation of the lamp, the driver 31 supplies a drive current $I_{DRIVE}$ to the LED light source 3, which emits light L with a radiant flux according to the drive current $I_{DRIVE}$. Usually, for an LED luminaire that is not dimmable, the drive current $I_{DRIVE}$ is essentially constant during normal operation of the lamp. The coded light modulator 1 allows the luminaire containing the LED light source 3 to also perform coded light modulation. To this end, a data interface 12 receives a data stream D from some appropriate source and encodes it using a suitable line code such as a Manchester code. To modulate the radiant flux of the LED light source 3, the coded light modulator 1 either subtracts a current quantity from the drive current $I_{DRIVE}$ to generate a "0" or logic low on the coded light output $L_{coded}$, or adds a comparable current quantity to the drive current $I_{DRIVE}$ to generate a "1" or logic high on the coded light output $L_{coded}$. A photodetector 51 or photosensor 51 in the receiver device 50 can detect the changes in light level to recover the original data stream D. To perform the CL modulation, the coded light modulator 1 comprises a switch arrangement with a number of switches S1, S2 and an energy storage arrangement comprising a number of energy storage devices E1, E2. A switch configuration selector 13 generates switch control signals 131, 132 to control the switches S1, S2 according to the desired logic level. The switches S1, S2 in turn connect the capacitors E1, E2 either in a parallel arrangement or a series arrangement. To make a logic "0", a first current controller B1 diverts a current quantity from the drive current $I_{DRIVE}$, and the switches S1, S2 are controlled to connect the capacitors E1, E2 in a parallel arrangement. To make a logic "1", the switches S1, S2 are controlled to connect the capacitors E1, E2 in a series arrangement, and a second current controller B2 allows the capacitors E1, E2 to discharge, so that a current quantity is added to drive current $I_{DRIVE}$. This is explained in FIGS. 2 and 3, which demonstrate how a logic "0" and a logic "1" are generated, respectively.

Figure 2:
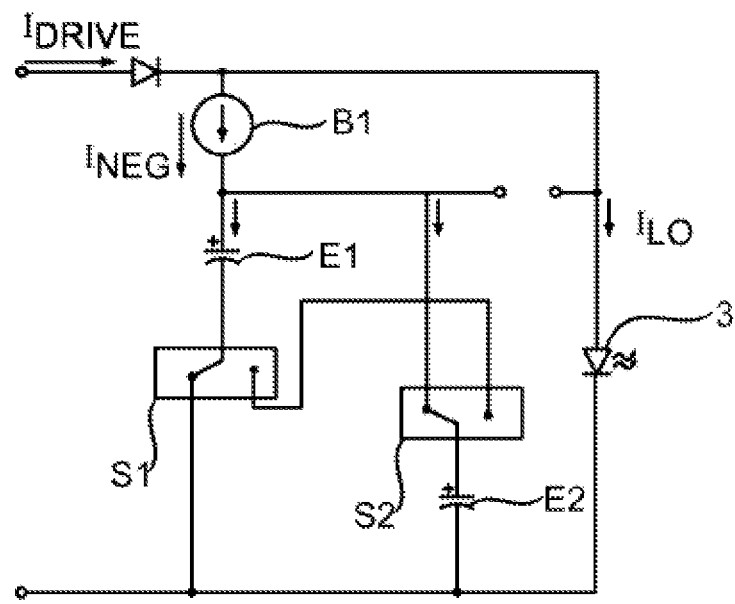
FIG. 2 shows a simplified schematic representation of the coded light modulator of FIG. 1 in a first switch configuration.

In FIG. 2, the switches S1, S2 are connected in a charging switch configuration, i.e. the capacitors E1, E2 are connected in parallel. The first current controller B1 passes current, while the second current controller B2 is effectively an open circuit. A current quantity $I_{NEG}$ is diverted from the drive current $I_{DRIVE}$ and charges the capacitors E1, E2. Accordingly, the LED current $I_{LO}$ is less than the drive current $I_{DRIVE}$, i.e. $I_{LO}=I_{DRIVE}-I_{NEG}$. The lower LED current $I_{LO}$ results in a lower radiant flux, corresponding to a logic low in the coded light $L_{coded}$.

Figure 3:
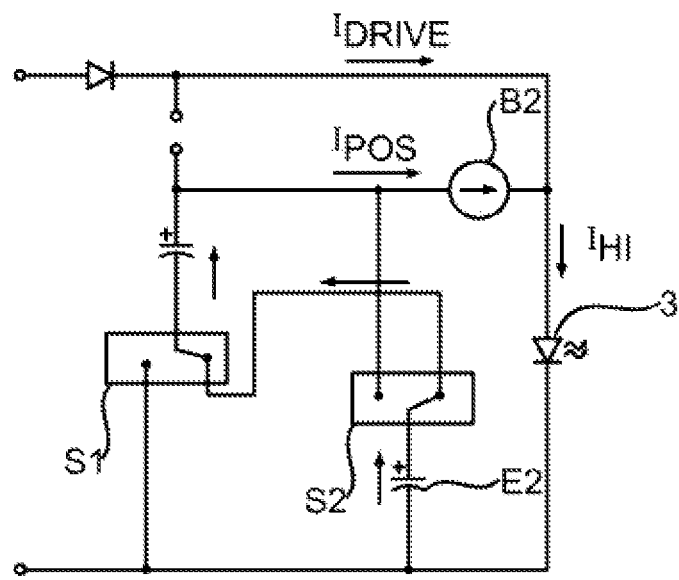
FIG. 3 shows a simplified schematic representation of the coded light modulator of FIG. 1 in a second switch configuration.

In FIG. 3, the switches S1, S2 are connected in a discharging switch configuration, i.e. the capacitors E1, E2 are connected in series. The first current controller B1 is effectively an open circuit, while the second current controller B2 passes current. The capacitors E1, E2 can discharge a current quantity $I_{POS}$ which is added to the drive current $I_{DRIVE}$. Accordingly, the LED current $I_{HI}$ is greater than the drive current $I_{DRIVE}$, i.e. $I_{HI}=I_{DRIVE}+I_{POS}$. The higher LED current $I_{HI}$ results in a higher radiant flux, corresponding to a logic high in the coded light $L_{coded}$.

Figure 4:
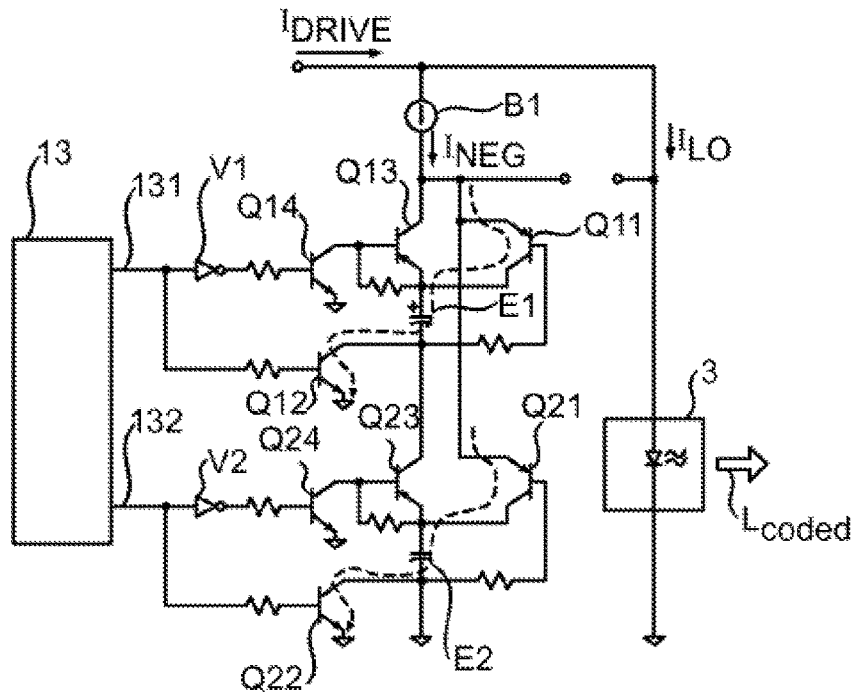
FIG. 4 shows a simplified circuit representation of the coded light modulator of FIG. 1 in the first switch configuration.
Figure 5:
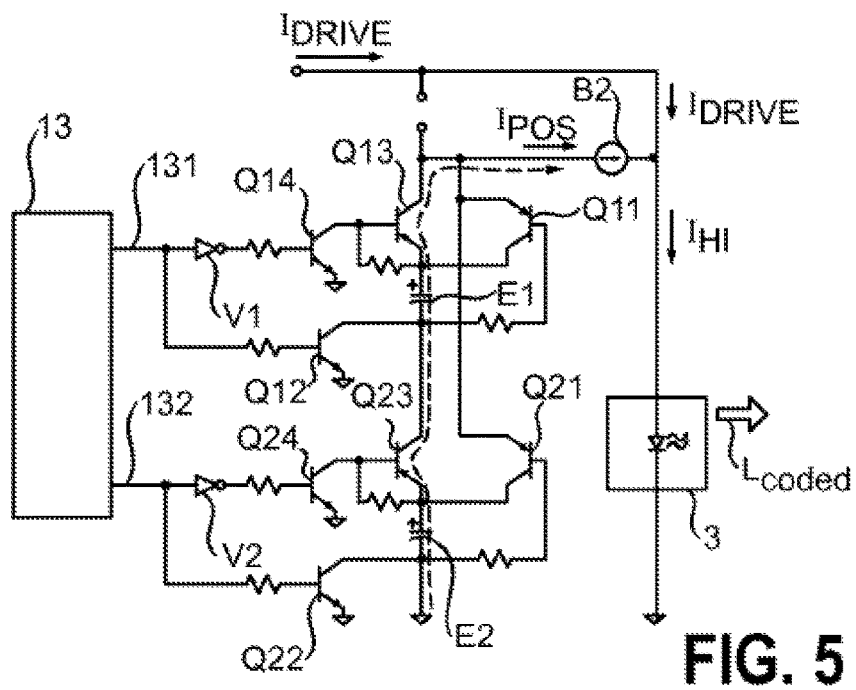
FIG. 5 shows a simplified circuit representation of the coded light modulator of FIG. 1 in the second switch configuration.

FIGS. 4 and 5 are simplified circuit representations of the coded light modulator of FIG. 1, showing a possible realisation of the switches S1, S2 using BJTs. Each "switch" in these diagrams comprises an inverter, four BJT's and various resistors, so that switch S1 comprises four BJTs Q11, Q12, Q13, Q14 and inverter V1, while switch S2 comprises four BJTs Q21, Q22, Q23, Q24 and inverter V2.

FIG. 4 corresponds to FIG. 2, and shows the capacitors E1, E2 connected in a parallel arrangement by the charging switch configuration. In this case, switch control signals 131, 132 are both high, so that transistors Q12, Q11 and transistors Q22, Q21 are turned on, while transistors Q13, Q14 and transistors Q23, Q24 are turned off. The current quantity $I_{NEG}$ diverted from the drive current $I_{DRIVE}$ through the first current controller B1 is used to charge the capacitors E1, E2, and the reduced LED current $I_{LO}$ results in a logic "low" in the coded light $L_{coded}$. Since the voltage at the input to the second current controller is low, the second current controller B2 is effectively open.

FIG. 5 corresponds to FIG. 3, and shows the capacitors E1, E2 connected in series by the discharging switch configuration. In this case, switch control signals 131, 132 are both low, so that transistors Q13, Q14 and transistors Q23, Q24 are turned on, while transistors Q11, Q12 and transistors Q21, Q22 are turned off. The capacitors E1, E2 discharge a current quantity $I_{POS}$ through the second current controller B2 to augment the drive current $I_{DRIVE}$, giving a higher LED current $I_{HI}$ and a logic "high" in the coded light $L_{coded}$. Since the voltage at the output of the first current controller is high, the first current controller B1 is effectively open.

Figure 6:
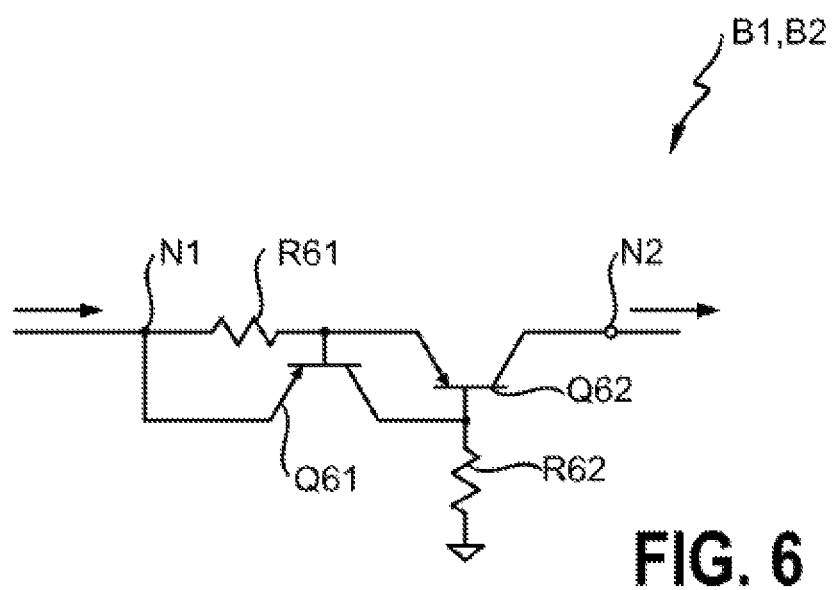
FIG. 6 shows an embodiment of a current regulator of a coded light modulator according to the invention.

FIG. 6 shows an exemplary embodiment of a current regulator B1, B2 for use in a coded light modulator according to the invention. In this embodiment, they are linear regulator. Here, the current regulator B1, B2 comprises two NPN BJTs Q61, Q62 connected so that, when the voltage at the input node N1 is higher (allowing for a certain headroom) than the voltage at the output node N2, a current will flow. The current magnitude is essentially determined by the size of resistor R61. When implemented as the first current controller B1, a charging switch configuration will allow this circuit to pass current (the portion $I_{NEG}$ diverted from the drive current) so that the capacitors E1, E2 are fully charged. When implemented as the second current controller B2, a discharging switch configuration will allow this circuit to pass current (the portion $I_{POS}$ added to the drive current) while the capacitors E1, E2 discharge.

Figure 7:
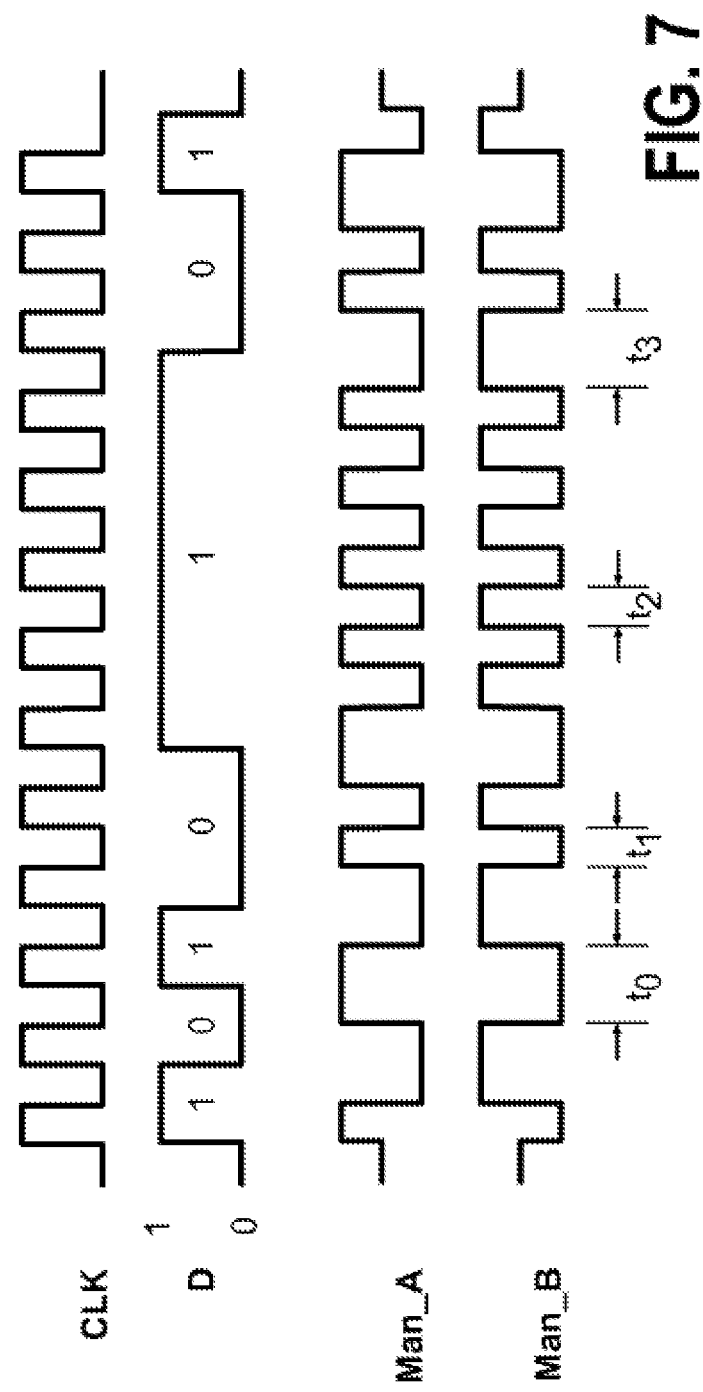
FIG. 7 shows a timing diagram with signals relative to the invention.

FIG. 7 shows a timing diagram with signals relevant to a line code that may be implemented by invention. Here, a data bitstream D toggles between 1 and 0 levels. A clock CLK determines the data rate. Since coded light can only "transmit" one bitstream, this must be self-clocking. Furthermore, the mean radiant flux of the coded light should not differ significantly from the radiant flux of the light emitted during "normal" operation of the lamp. The diagram shows two Manchester code versions Man_A, Man_B that fulfil these requirements. To modulate the light according to this line code, the data input interface 12 of FIG. 1 can encode the bitstream D using an appropriate Manchester code, e.g. Man_B, and the switch configuration selector 13 generates switch control signals 131, 132 according to the encoded bitstream Man_B.

For example, to achieve a logic "low" at interval $t_0$ or interval $t_1$, the capacitors E1, E2 (that were partially or completely discharged in a previous step are switched in parallel by the charging switch configuration, so that current $I_{NEG}$ is diverted from the drive current $I_{DRIVE}$ to charge the capacitors E1, E2. The duration of the charging switch configuration depends on the required logic level duration, for example interval $t_0$ is longer than interval $t_1$.

Similarly, to achieve a logic "high" at interval $t_2$ or interval $t_3$, the capacitors E1, E2 (partially or completely charged in a previous step) are switched in series by the discharging switch configuration, so that current $I_{POS}$ is added to the drive current $I_{DRIVE}$ as the capacitors E1, E2 discharge. Here also, the duration of the discharging switch configuration depends on the required logic level duration.

Figure 8:
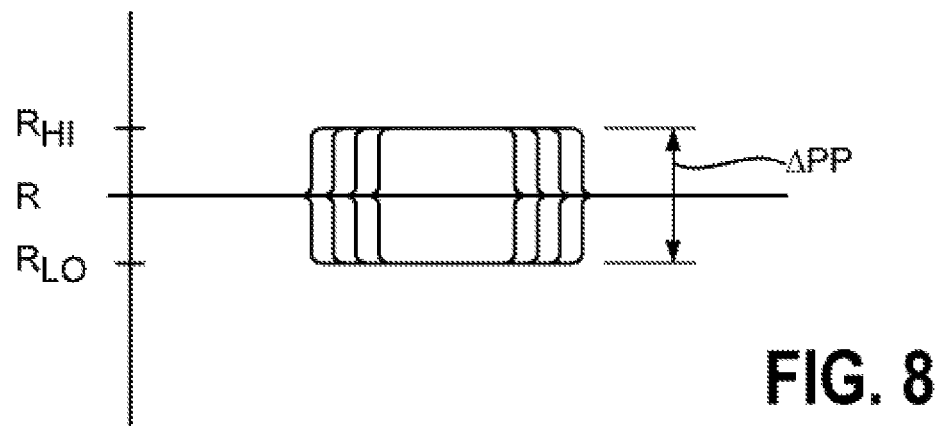
FIG. 8 shows light levels for a coded light modulator.

FIG. 8 shows light levels for a coded light modulator. A "normal" level R of radiant flux corresponds to the normal operation of a luminaire, i.e. the luminaire is fulfilling its primary function of providing illumination. When the luminaire is used in a coded light communication arrangement, a higher level $R_{HI}$ of radiant flux corresponds to a logic "1" in the emitted light $L_{coded}$, while a lower level $R_{LO}$ of radiant flux corresponds to a logic "0" in the emitted light $L_{coded}$. For a coded light data transfer to be successfully detected and decoded at a receiver, it may be necessary to define a certain minimum peak-to-peak difference $\Delta_{PP}$ in radiant flux or light intensity, and a certain minimum duration of a "logic level" in the coded light $L_{coded}$. These requirements will in turn determine the high and low LED current levels $I_{HI}$, $I_{LO}$. This information can then be used to determine an appropriate choice of components for the energy storage devices E1, E2, the switches S1, S2 and the current controllers B1, B2. For example, the energy storage capacitors E1, E2 should be able to charge/discharge current during one data packet at a certain modulation depth. The maximum charge to be "parked" in the energy storage arrangement can be calculated by multiplying the number of bits by the bit duration and by the modulation current ($I_{NEG}$ or $I_{POS}$). For coded light transmission, a data packet generally contains three bytes and is transmitted at $\frac{1}{16}$ kHz. The modulation current will depend on the modulation depth and nominal lamp current. An exemplary calculation based on a 20% modulation depth results in approximately 0.0003375 coulombs, which translates into a capacitance of 1 µF for an energy storage element E1, E2. Preferably, the components are chosen to achieve essentially equal values of negative modulation current $I_{NEG}$ and positive modulation current $I_{POS}$, so that the mean radiant flux of the lamp remains essentially constant, regardless of whether the lamp is being used as a CL modulator or just as a source of illumination.

Figure 9:
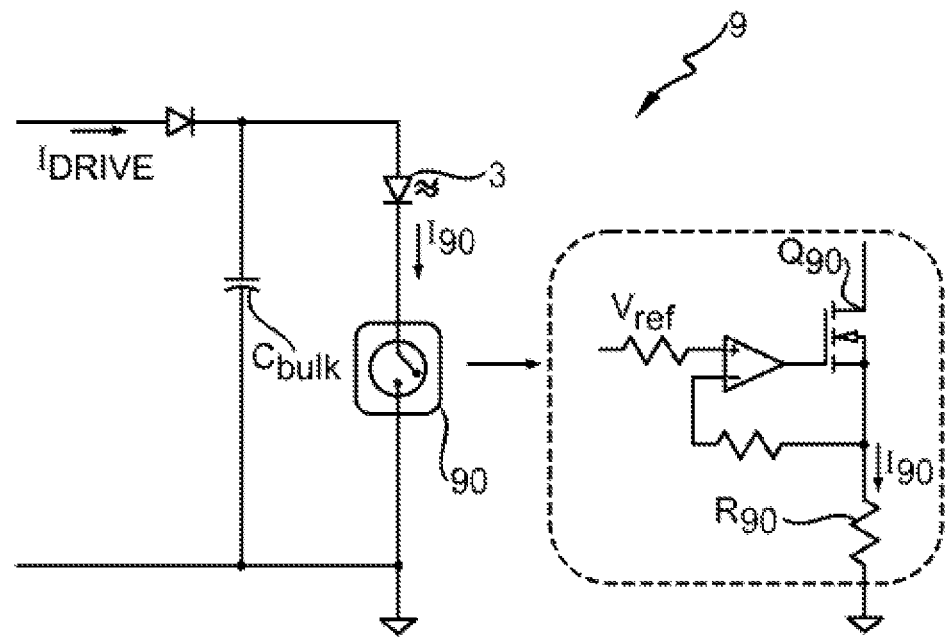
FIG. 9 is a schematic diagram of a prior art coded light modulator.

FIG. 9 is a schematic diagram of a prior art coded light modulator, realized to perform amplitude modulation of the LED current (and therefore also the radiant flux). A current controllable switch 90 is arranged in series with an LED light source 3. By controlling a reference voltage $V_{ref}$, a desired LED current $I_{90}$ can be achieved ($I_{90}=V_{ref}/R_{90}$). However, power is consumed by switch 90 in order to achieve an LED current transition to the intended high or low current level, since the switch 90 functions as a controllable resistor. Normally, an LED lamp receives a constant current input, so that $I_{DRIVE}$ can be regarded as constant over a short interval. Owing to the effect of the bulk capacitor $C_{bulk}$, the LED voltage can also be regarded as constant over a short interval. For a modulation current $I_{MOD}=k \cdot I_{DRIVE}$, where $0 \leq k \leq 1$, the power converted to luminous flux changes from $I_{DRIVE} \cdot V_f$, where $V_f$ is the LED forward voltage, to $(I_{DRIVE}-I_{MOD}) \cdot V_f$. The extra energy has been absorbed by the switch resistive load R90. The power dissipated by the switch will depend on the modulation depth, which in turn is given by the value of k. For example, a 20% modulation depth (i.e. the LED current for a logic level is 20% higher or lower than the normal LED current) with k=0.2 results in additional 20% power dissipation. The power dissipation has a negative impact on the overall efficiency of the lamp.

As described above, this problem is solved by the inventive coded light modulator, in which energy is pre-charged to an energy storage arrangement during normal operation of the lamp or during a negative modulation interval, and discharged into the LED current during a positive modulation interval. In other words, the resistive component known from the prior art modulator has been eliminated, so that power losses are minimized during coded light modulation.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A coded light modulation arrangement, adapted to be connected between a driver and a LED, which coded light modulation arrangement comprises input terminals adapted to connect to the driver and to receive a drive current;

an energy storage arrangement comprising a number of energy storage devices;

a data input interface realized to receive a data stream, said data stream comprises a sequence of binary symbols comprising a logic high and a logic low; and a switch arrangement comprising a number of switches arranged to connect the energy storage devices of the energy storage arrangement and to modulate the drive current such that, in a charging switch configuration corresponding to the logic low, a negative modulation current is diverted from a drive current of the LED to the energy storage arrangement such that the LED is adapted to emit a low radiant flux level and an energy of the diverted current is adapted to be stored at the energy storage arrangement; and, in a discharging switch configuration corresponding to the logic high, the energy stored at the energy storage arrangement is adapted to be released as a positive modulation current from the energy storage arrangement and added to the drive current of the LED such that the LED is adapted to emit a high radiant flux level;

output terminals adapted to connect to the LED and to provide the modulated drive current directly to the LED to emit the low and high radiant flux level as coded light to be received by a photosensor of a coded light receiver device.

2. A coded light modulation arrangement according to claim 1, wherein a switch of the switch arrangement is connected in series with an energy storage device.

3. A coded light modulation arrangement according to claim 1, wherein the energy storage devices and switches are arranged such that a first switch configuration is adapted to connect the energy storage devices in parallel, wherein an anode of a first energy storage device of the energy storage devices is adapted to be connected to a positive terminal of the output of the driver, and a first switch of the switches is adapted to couple a cathode of the first energy storage device to a negative terminal of the output of the driver, and a second switch of the switches is adapted to couple an anode of a second energy storage device of the energy storage devices at the positive terminal output of the driver, an cathode of the second energy storage device is adapted to be connected to the negative terminal of the output of the driver.

4. A coded light modulation arrangement according to claim 3, wherein the energy storage devices and switches are arranged such that a second switch configuration is adapted to connect the energy storage devices in series, the first switch and the second switch are adapted to couple the cathode of the first energy storage device and the anode of the second energy storage device, wherein the energy storage devices is switchable either in series or in parallel.

5. A coded light modulation arrangement according to claim 4, comprising a switch configuration selector, wherein the switch configuration selector is adapted to control all the switches of the switch arrangement in a synchronous manner.

6. A coded light modulation arrangement according to claim 1, comprising a first current controller adapted to to direct the negative modulation current to the energy storage arrangement, and a second current controller adapted to direct a positive modulation current to the LED.

7. A coded light modulation arrangement according to claim 1, wherein an energy storage device of the energy storage arrangement comprises a capacitor.

8. A coded light modulation arrangement according to claim 1, wherein the energy storage arrangement comprises at least two capacitors, and wherein a total series capacitance of the energy storage arrangement is sized to provide a desired amplitude and duration of a modulated information bit of the data stream.

9. A coded light modulation arrangement according to claim 1, comprising a switch configuration selector adapted to select switch configurations of the switch arrangement on the basis of logic transitions in the data stream.

10. A coded light modulation arrangement according to claim 9, wherein said switch configuration selector is adapted to select a charging switch configuration when one symbol is the logic low and to select a discharging switch configuration when one symbol is the logic high.

11. A coded light modulation arrangement according to claim 9, wherein the switch configuration selector is adapted to generate switch control signals according to a Manchester code.

12. A luminaire comprising
a LED;
a driver adapted to provide a drive current to the LED; and
a coded light modulation arrangement according to claim 1 arranged between the driver and the LED.

13. A coded light communication arrangement comprising
a number of luminaires according to claim 12;
a transmitter module adapted to transmit a data packet to a luminaire for transmission as coded light;
a receiver module adapted to detect coded light and to extract a data packet from the detected coded light.

14. A coded light communication arrangement according to claim 13, the number of luminaires being installed in a retail environment.

* * * * *